United States Patent
Park et al.

(10) Patent No.: US 9,001,769 B1
(45) Date of Patent: Apr. 7, 2015

(54) MANAGING ACCESS NODE CHANNEL LOADING

(71) Applicant: Sprint Spectrum LP, Overland Park, KS (US)

(72) Inventors: Sungki Park, Ashburn, VA (US); Brent A. Scott, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 170 days.

(21) Appl. No.: 13/828,645

(22) Filed: Mar. 14, 2013

(51) Int. Cl.
 - *H04W 36/06* (2009.01)
 - *H04W 72/06* (2009.01)
 - *H04L 12/803* (2013.01)

(52) U.S. Cl.
 CPC .............. *H04W 36/06* (2013.01); *H04W 72/06* (2013.01); *H04L 47/125* (2013.01)

(58) Field of Classification Search
 None
 See application file for complete search history.

(56) References Cited

U.S. PATENT DOCUMENTS

| | | | |
|---|---|---|---|
| 2007/0115880 A1* | 5/2007 | Huh et al. | 370/329 |
| 2010/0091726 A1* | 4/2010 | Ishii et al. | 370/329 |
| 2011/0044253 A1 | 2/2011 | Zisimopoulos | |
| 2011/0320588 A1 | 12/2011 | Raleigh | |
| 2012/0135719 A1 | 5/2012 | Haughn | |
| 2012/0176994 A1 | 7/2012 | Huang et al. | |
| 2012/0236712 A1* | 9/2012 | Park et al. | 370/230 |

* cited by examiner

*Primary Examiner* — Kerri Rose

(57) ABSTRACT

It is determined that a first channel loading of a first access node channel meets a loading threshold. Wireless devices in active communication over the first access node channel are identified, the wireless devices comprising an application running on each wireless device, each application comprising an application requirement which meets an application requirement criteria. The identified wireless devices are ranked into a first order based on a modulation and coding scheme assigned to each wireless device, and are further ranked in a second order within the first order based on an indication of an amount of data pending transmission from each wireless device when two or more wireless devices are assigned the same modulation and coding scheme. Each identified wireless device is instructed to operate on a second access node channel according to the second order, until the first channel loading does not meet the loading threshold.

18 Claims, 6 Drawing Sheets

MANAGING ACCESS NODE CHANNEL LOADING

TECHNICAL BACKGROUND

As a number of wireless devices in communication with an access node increases, demand for communication link resources to provide communication services increases. The communication services can include interconnect or dispatch voice communications, as well as other data communications including streaming video and audio services, Internet access, and the like. Demand for communication link resources can be adjusted by managing the loading of communication links between wireless devices and access nodes.

OVERVIEW

In operation, it is determined that a first channel loading of a first access node channel meets a loading threshold. Wireless devices in active communication over the first access node channel are identified, wherein the identified wireless devices comprise an application running on each wireless device, each application comprising an application requirement which meets an application requirement criteria. The identified wireless devices are ranked into a first order based on a modulation and coding scheme assigned to each wireless device on the first access node channel, and are further ranked in a second order within the first order based on an indication of an amount of data pending transmission from each wireless device when two or more wireless devices are assigned the same modulation and coding scheme. Each identified wireless device is instructed to operate on a second access node channel according to the second order, until the first channel loading does not meet the loading threshold.

DETAILED DESCRIPTION

Figure 1:
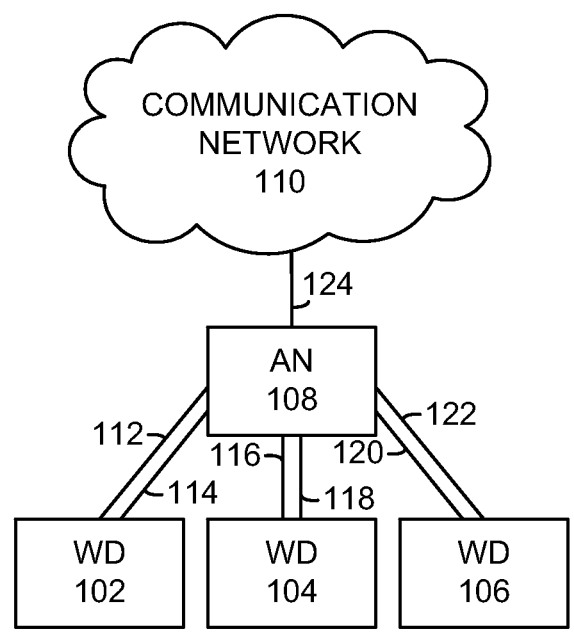
FIG. 1 illustrates an exemplary communication system to manage a loading of an access node channel.

FIG. 1 illustrates an exemplary communication system 100 to manage a loading of an access node channel comprising wireless devices 102, 104 and 106, access node 108, and communication network 110. Examples of wireless devices 102, 104 and 106 can comprise a cell phone, a smart phone, a computing platform such as a laptop, palmtop, or tablet, a personal digital assistant, or an internet access device, including combinations thereof. Wireless devices 102, 104 and 106 can communicate with access node 108 over a plurality of channels, carrier bands or carrier frequencies. For example, wireless device 102 can communicate with access node 108 over communication links 112 and 114, wireless device 104 can communicate with access node 108 over communication links 116 and 118, and wireless device 106 can communicate with access node 108 over communication links 120 and 122. Communication links 112, 116 and 120 correspond with a first channel, and communication links 114, 118 and 122 correspond with a second channel.

Access node 108 is a network node capable of providing wireless communications to wireless devices 102, 104 and 106, and can be, for example, a base transceiver station, a radio base station, an eNodeB device, or an enhanced eNodeB device. Access node 108 is in communication with communication network 110 over communication link 124.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying information, for example, to support voice and data communications by a wireless device such as wireless devices 102, 104 and 106. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise additional base stations, controller nodes, telephony switches, internet routers, network gateways, computer systems, communication links, or some other type of communication equipment, and combinations thereof.

Communication links 112, 114, 116, 118, 120, 122 and 124 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

In operation, it is determined that a first channel loading of a first access node channel (for example, corresponding with communication links 112, 116 and 120) meets a loading threshold. Wireless devices 102, 104 and 106 in active communication with access node 108 over the first access node channel are identified, wherein the identified wireless devices comprise an application running on each wireless device, each application comprising an application requirement which meets an application requirement criteria. The identified wireless devices 102, 104 and 106 are ranked into a first order based on a modulation and coding scheme assigned to each wireless device on the first access node channel, and are further ranked in a second order within the first order based on an indication of an amount of data pending transmission from each wireless device when two or more of wireless devices 102, 104 and 106 are assigned the same modulation and coding scheme. Each identified wireless device is instructed to operate on a second access node channel (for example, corresponding with communication links 114, 118 and 122) according to the second order, until the first channel loading does not meet the loading threshold.

Figure 2:
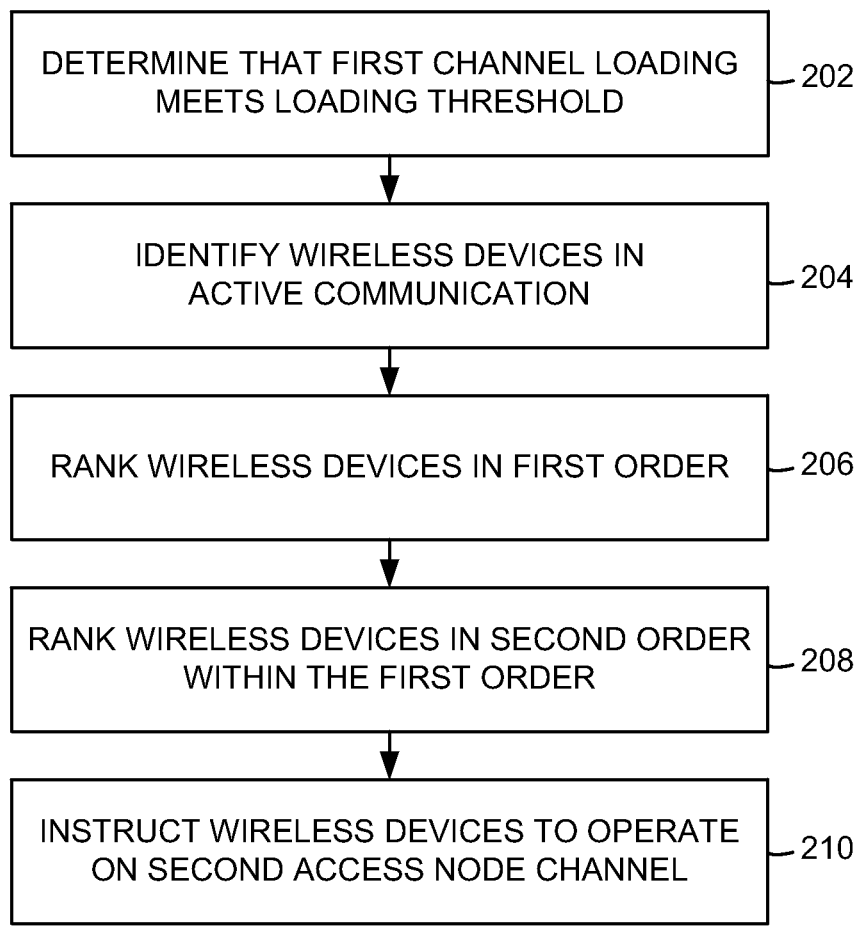
FIG. 2 illustrates an exemplary method of managing a loading of an access node channel.

FIG. 2 illustrates an exemplary method of managing a loading of an access node channel. In operation 202, is it determined that a first channel loading of a first access node channel meets a loading threshold. For example, it can be determined that a loading of a first channel of access node 108 meets a loading threshold. The channel loading can comprise a demand for communication link resources to send information from or to wireless devices 102, 104 and 106. For example, the channel loading can comprise a number of active users communicating over the first channel, a number of slots utilized in communication with wireless devices 102, 104 and 106, and a number of subframes utilized in communication with wireless devices 102, 104 and 106 loading. The channel loading can also be indicated by a modulation and coding scheme assigned to the communications of a wireless device, where the lower order the modulation and coding scheme assigned, the higher the loading (i.e., communication link utilization). The channel loading can also be indicated by a minimum service level guarantee provisioned for a wireless device, or assigned to traffic of a wireless device (for example, assigned to an application running on a wireless device). Additional examples of a channel loading are also possible, including combinations of the foregoing.

In operation 204, wireless devices in active communication with the access node on the first access node channel are identified, wherein the identified wireless devices comprise an application running on each wireless device, each application comprising an application requirement which meets an application requirement criteria. For example, wireless devices 102, 104 and 106 can be identified as being in active communication with access node 308. Wireless devices which are in active communication with an access node comprise wireless devices which are assigned a channel or frequency band to communicate with the access node, and further are not in a low power mode, such as an idle mode or a sleep mode. An example of a wireless device in active communication with an access node is a wireless device in RRC Connected mode or a similar communication mode. Wireless devices 102, 104 and 106 can be identified as being in active communication with access node 108. Further, an application running on each wireless device can be identified. Examples of an application running on a wireless device include a voice application (such as a voice over internet protocol (VoIP) application), a streaming media application (including streaming audio, video and multimedia), a text messaging application, an email application, a network-connected game application, an internet browsing application, an application for downloading a file, and the like. The application running on each of wireless devices 102, 104 and 106 can have an associated application requirement. The application requirement can comprise for example, a minimum data rate, or a maximum permitted data delay, or a maximum permitted error rate, and the like. The application requirement can also comprise a routing or scheduling priority associated with data traffic of the application, such as "best effort," "guaranteed bit rate," and so forth.

In operation 206, the identified wireless devices are ranked into a first order based on a modulation and coding scheme (MCS) assigned to each wireless device on the first access node channel. For example, identified wireless devices 102, 104 and 106 can each be assigned an MCS to use when communicating with access node 108, such as QSPK, 16QAM, 64QAM, and the like. Further, wireless devices 102, 104 and 106 can be ranked based on their assigned MCS. For example, the wireless devices can be ranked based on an amount of data which each MCS can carry per unit time. Where wireless device 102 is assigned an MCS of QPSK, wireless device 104 is assigned an MCS of 16QAM, and wireless device 106 is assigned an MCS of 64QAM, the wireless devices could be ranked in an order of wireless devices 102, 104, and 106.

In operation 208, the identified wireless devices are ranked into a second order within the first order based on an indication of an amount of data pending transmission from each wireless device when two or more wireless devices are assigned the same MCS. For example, wireless devices 102 and 104 could both be assigned an MCS of QPSK. To further distinguish wireless devices 102 and 104, an indication of an amount of data pending transmission can be received from each wireless device, such as a buffer status report or similar message. In an example, where a first buffer status report (or similar indication) from wireless device 102 indicates a greater amount of data than a second buffer status report (or similar indication) from wireless device 104, wireless device 102 can be ranked higher than wireless device 104.

In operation 210, each identified wireless device is instructed according to the second order to operate on a second access node channel, until the first channel loading does not meet the loading threshold. For example, where wireless devices are ranked in an order 102, 104, and 106, wireless device 102 can be instructed to operate on a second channel of access node 108, and the first channel loading can be reevaluated. In an embodiment, the instruction can command that a handover is performed to hand over wireless devices from the first channel to the second channel. When, after wireless device 102 is instructed to operate on the second channel, and the first channel loading still meets the loading threshold, wireless device 104 can be instructed to operate on the second channel of access node 108, and the first channel loading can be reevaluated. When, after wireless device 104 is instructed to operate on the second channel, and the first channel loading still meets the loading threshold, wireless device 106 can be instructed to operate on the second channel of access node 108, and the first channel loading can be reevaluated.

Figure 3:
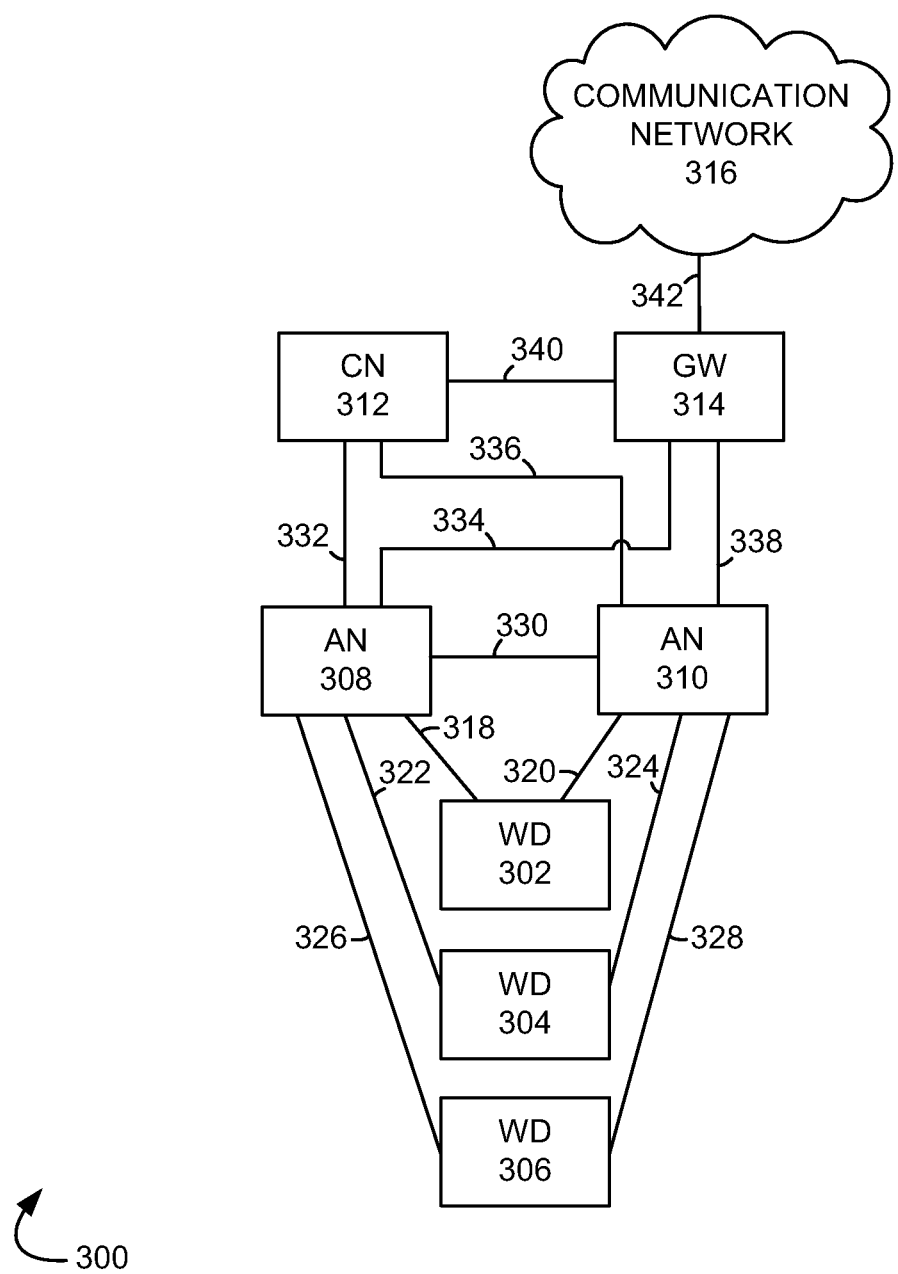
FIG. 3 illustrates another exemplary communication system to manage a loading of an access node channel.

FIG. 3 illustrates another exemplary communication system 300 to manage a loading of an access node channel comprising wireless device 302, 304 and 306, access nodes 308 and 310, communication network 312, gateway 314, and communication system 316. Examples of wireless devices 302, 304 and 306 can comprise a cell phone, a smart phone, a computing platform such as a laptop, palmtop, or tablet, a personal digital assistant, or an internet access device, including combinations thereof. Wireless device 302 can communicate with access node 308 over communication link 318 and with access node 310 over communication link 320. Wireless device 304 can communicate with access node 308 over communication link 322 and 324, and with access node 310 over communication link 324. Wireless device 306 can communicate with access node 308 over communication link 326 and with access node 310 over communication link 328. Communication links 318, 322 and 326 correspond with a first channel, and communication links 320, 324 and 328 correspond with a second channel.

Access nodes 308 and 310 are network nodes capable of providing wireless communications to wireless devices 302, 304 and 306, and can be, for example, a base transceiver station, a radio base station, an eNodeB device, or an enhanced eNodeB device. Access node 308 and access node 310 can communicate with each other over communication link 330. Access node 308 is in communication with controller node 312 over communication link 332 and with gateway 314 over communication link 334. Access node 310 is in communication with controller node 312 over communication link 336 and with gateway 314 over communication link 338.

Controller node 312 can control the setup and maintenance of a communication session over communication network 316 by wireless devices 302, 304 and 306. Controller node 312 can comprise a mobile switching center (MSC), a mobility management entity (MME), a dispatch call controller (DCC), or other similar network node capable of supporting the appropriate functionality. Controller node 312 can retrieve and execute computer-readable instructions from storage, which can include a disk drive, flash drive, memory circuitry, or some other memory device, and which can be local or remotely accessible. The computer-readable instructions comprise computer programs, firmware, or some other form of machine-readable instructions, and may include an operating system, utilities, drivers, network interfaces, applications, or some other type of software, including combinations thereof. Controller node 312 can receive instructions and other input at a user interface. Controller node is in communication with gateway 314 over communication link 340.

Gateway 314 can act as a gateway for communications between access nodes 308 and 310 and communication network 316. Examples of gateway 314 can include access service network gateways (ASN-GW), mobile switching controllers (MSC), packet data serving nodes (PDSN), call processing equipment, home agents, radio node controllers (RNC), subscriber profile systems (SPS), authentication, authorization, and accounting (AAA) equipment, wireless access points, Internet routers, network gateways, systems as well as other types of communication equipment, including combinations thereof. Gateway 314 can retrieve and execute computer-readable instructions from storage, which can include a disk drive, flash drive, memory circuitry, or some other memory device, and which can be local or remotely accessible. The computer-readable instructions comprise computer programs, firmware, or some other form of machine-readable instructions, and may include an operating system, utilities, drivers, network interfaces, applications, or some other type of software, including combinations thereof. Gateway 314 can receive instructions and other input at a user interface. Gateway can communicate with communication network 316 over communication link 342.

Communication network 316 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 316 can be capable of carrying voice information, for example, to support voice communications by a wireless device such as wireless devices 302, 304 and 306. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 316 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 316 may also comprise additional base stations, controller nodes, telephony switches, internet routers, network gateways, computer systems, communication links, or some other type of communication equipment, and combinations thereof.

Communication links 318, 320, 322, 324, 326, 328, 330, 332, 334, 336, 338, 340 and 342 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 308 and 310, controller node 312, gateway 314, and communication network 316 which are omitted for clarity, including additional processing nodes, routers, gateways, and physical and/or wireless data links for carrying data among the various network elements.

Figure 4:
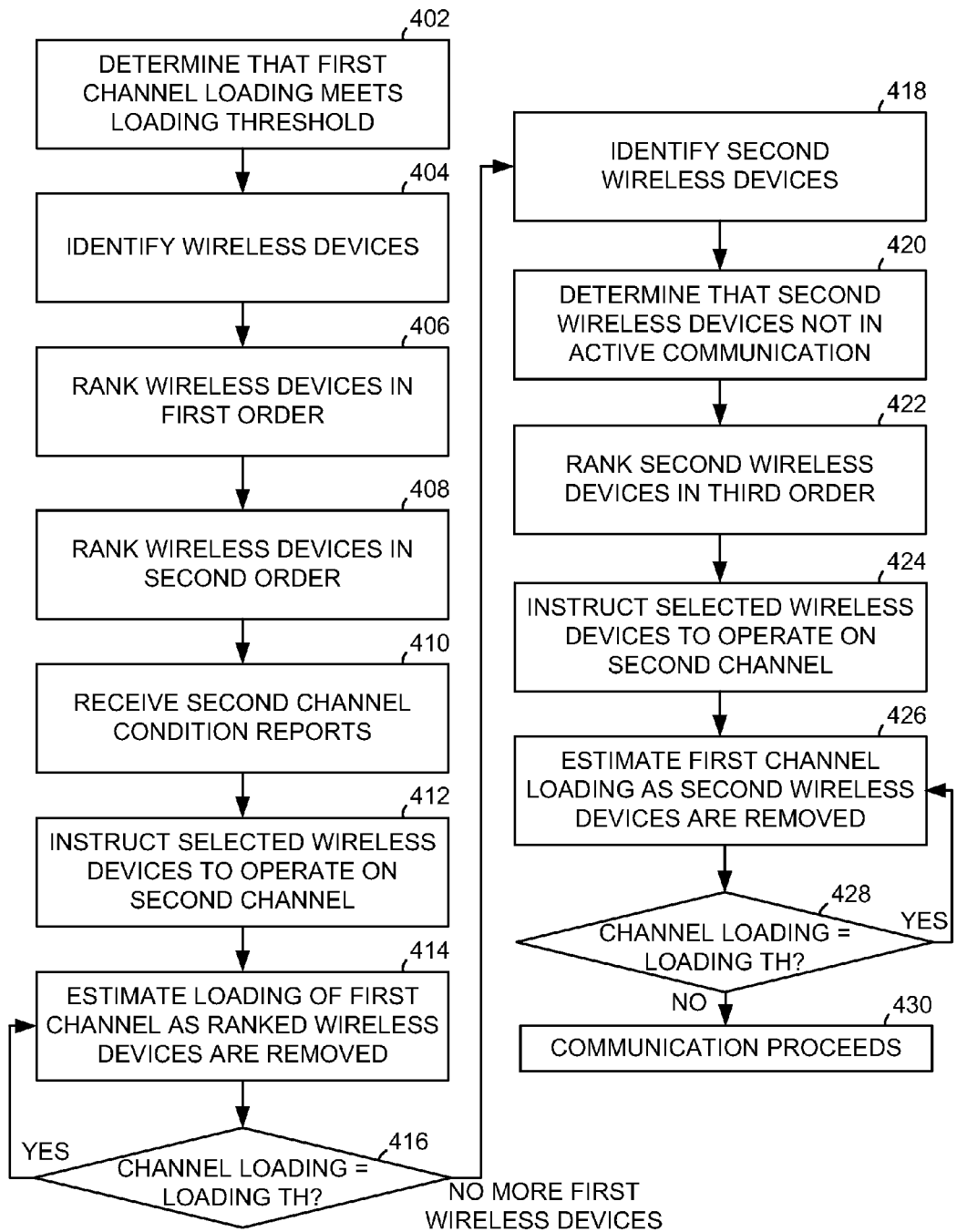
FIG. 4 illustrates another exemplary method of managing a loading of an access node channel.

FIG. 4 illustrates another exemplary method of managing a loading of an access node channel. In operation 402, is it determined that a first channel loading of a first access node channel meets a loading threshold. For example, it can be determined that a loading of a first channel of access node 308 meets a loading threshold. The first channel loading can comprise a demand for communication link resources to send information between access node 308 and wireless devices 302, 304 and/or 306. The first channel loading can also comprise a minimum data rate, or a maximum permitted data delay, or a maximum error rate, required by an application running on each of wireless devices 302, 304 and 306. The first channel loading can also comprise a number of wireless devices in active communication with access node 308 over the first channel.

In operation 404, wireless devices in active communication with the access node on the first channel are identified, wherein the identified wireless devices comprise an application running on each wireless device, each application comprising an application requirement which meets an application requirement criteria. For example, wireless devices 302, 304 and 306 can be identified as being in active communication with access node 308. Wireless devices which are in active communication with an access node comprises wireless devices which are not in a low power mode, such as an idle mode or a sleep mode, such as a wireless device which is assigned a channel or frequency band to communicate with the access node. An example of a wireless device in active communication with an access node is a wireless device in RRC Connected mode or a similar communication mode.

Further, an application running on each wireless device can be identified. Examples of an application running on a wireless device include a voice application (such as a voice over internet protocol (VoIP) application), a streaming media application (including streaming audio, video and multimedia), a text messaging application, an email application, a network-connected game application, an internet browsing application, an application for downloading a file, and the like. The application running on each of wireless devices 302, 304 and 306 can have an associated application requirement. For example, an application can be associated with a minimum data rate, or a maximum permitted data delay, a maximum error rate, a guaranteed bit rate, a non-guaranteed bit rate, and the like, required by an application running on each of wireless devices 302, 304 and 306. As an example, a VoIP application or a streaming media application may require a greater rate per unit time than an email application or a web browsing application. An application can also comprise a data usage, a bandwidth usage, or another indication of data demand or usage associated with the application running on a wireless device. The application requirement can also comprise a routing or scheduling priority associated with data traffic of the application, such as "best effort," "guaranteed bit rate," and so forth.

It can be determined whether the application requirement of each application meets an application requirement criteria. In an embodiment, the application requirement criteria can comprise a minimum data rate, or a maximum permitted data delay, a maximum error rate, a guaranteed bit rate, a non-guaranteed bit rate, and the like. The application requirement criteria can also comprise a data usage threshold, a bandwidth usage threshold, or another threshold of data demand or usage. The application requirement criteria can also comprise combinations thereof. Wireless devices in active communication with the access node on the first channel are identified, wherein the identified wireless devices comprise an application running on each wireless device, each application comprising an application requirement which meets an application requirement criteria. In an embodiment, wireless devices are identified which comprise comparatively high data demand or data usage, and comparatively low minimum data rate, maximum permitted data delay, maximum error rate, and the like.

In operation 406, the identified wireless devices are ranked into a first order based on a modulation and coding scheme (MCS) assigned to each wireless device on the first access node channel. For example, identified wireless devices 302, 304 and 306 can each be assigned an MCS to use when communicating with access node 308, such as QSPK, 16QAM, 64QAM, and the like. Further, wireless devices 302, 304 and 306 can be ranked based on their assigned MCS. For example, the wireless devices can be ranked based on an amount of data which each MCS can carry per unit time. Where wireless device 302 is assigned an MCS of QPSK, wireless device 304 is assigned an MCS of 16QAM, and wireless device 306 is assigned an MCS of 64QAM, the wireless devices could be ranked in an order of wireless devices 302, 304 and 306.

In operation 408, the identified wireless devices are ranked into a second order within the first order based on an indication of an amount of data pending transmission from each wireless device when two or more wireless devices are assigned the same MCS. For example, wireless devices 302 and 304 could both be assigned an MCS of QPSK. To further distinguish wireless devices 302 and 304, an indication of an amount of data pending transmission can be received from each wireless device. In an example, where a first buffer status report (or similar indication) from wireless device 302 indicates a greater amount of data than a second buffer status report (or similar indication) from wireless device 304, wireless device 302 can be ranked higher than wireless device 304.

In operation 410, a second channel condition report is received from each of the selected wireless devices. For example, wireless devices 302, 304 and 306 can be instructed to scan the second channel and to provide a second channel condition report to access node 308. The second channel condition report can comprise, for example, a signal strength measurement or a signal quality measurement, and can further comprise a received signal strength indicator (RSSI), a reference signal received power (RSRP), a reference signal received quality (RSRQ), a signal to noise ratio (SNR), a signal plus interference to noise ratio (SINR), a carrier plus interference to noise ratio (CINR), and the like. In an embodiment, the channel condition criteria can indicate that the second channel comprises a sufficient channel capacity to support a selected wireless device. For example, the second channel condition report can indicate sufficient bandwidth to support an application requirement of a wireless device. In an embodiment, based on the second channel condition reports, a second channel loading of the second channel can be determined. In an embodiment, the second channel condition reports are received over the first access node channel. For example, wireless device 320 can provide a second channel condition report over communication link 318 associated with the first access node channel.

In operation 412, a selected wireless device is instructed to operate on the second access node channel when the second channel condition report meets a channel condition criteria. For example, second channel conditions reports can be received from wireless devices 302, 304 and 306. The second channel condition report can be considered independently for each of wireless devices 302, 304 and 306. Where a second channel condition report from a wireless device meets a criteria, that wireless device can be instructed to operate on the second channel. For example, where the second channel condition report comprises an RSSI, a criteria can comprises a minimum RSSI level. Similarly, the criteria can comprise a minimum indication of signal strength, signal quality, signal interference, and the like, including combinations thereof. In an embodiment, the loading criteria can indicate that the second channel meets the application requirement of a selected wireless device. In an embodiment, a selected wireless device is instructed to operate on the second access node channel when the second channel condition report meets a channel condition criteria and when the second channel loading meets a loading criteria for a selected wireless device. In an embodiment, when wireless devices are instructed to operate on the second channel, a handover is performed to hand over wireless devices from access node 308 to access node 310.

In an embodiment, wireless devices can be instructed to operate on the second channel based on a traffic class identifier associated with each wireless device. For example, each wireless device can be associated with a traffic class indicator, which can be determined based on a type information sent to and/or received from communication system 300, such as a bearer type or bandwidth allocation priority (for example, guaranteed bit rate, non-guaranteed bit rate, and the like), a priority for the information (such as a data packet priority or a traffic flow priority) a permitted (e.g., maximum) level of data delay, a permitted data error rate, a permitted data loss rate, and so forth. An example of a traffic class identifier comprises a quality of service (QoS) class indicator (QCI). Thus, a traffic class identifier associated with each wireless device can be used to further rank or order the wireless devices, and wireless devices can be instructed to operate on the second channel based on their respective associated traffic class identifier. In an embodiment, the wireless devices can be instructed to operate on the second channel according to the order determined according to the associated traffic class identifier.

In an embodiment, wireless devices can be instructed to operate on the second channel based on a QCI associated with each wireless device. QCIs can indicate, among other things, whether a bearer channel is a guaranteed bit rate or non-guaranteed bit rate bearer. In an embodiment, wireless devices can be instructed to operate on the second channel when an associated QCI indicates that the wireless device has a non-guaranteed bit rate. Wireless devices associated with a guaranteed bit rate can be instructed to operate on the second channel when no non-guaranteed bit rate wireless device remain. Additionally, or alternatively, wireless devices associated with a guaranteed bit rate can be prevented from being instructed to communicate on the second channel. In an embodiment, the wireless devices can be instructed to operate on the second channel according to an order determined according to the associated QCI. For example, a QCI can be assigned a numerical value, such as an integer from 1 to 9, where 9 is associated with the lowest priority and 1 is associated with the highest priority QCI. In such example, wireless devices can be instructed to operate on the second channel according to the order determined according to the associated QCI, for example, wireless devices associated with a QCI of 9, then wireless devices associated with a QCI of 8, then wireless devices associated with a QCI of 7, and so forth.

In operation 414, each identified wireless device is instructed according to the second order to operate on a second access node channel, and the first channel loading of the first access node channel is estimated as each wireless device is removed from the first channel. When the first channel loading meets the loading threshold (operation 416—YES), another wireless device is instructed according to the second order to operate on a second access node channel, and the first channel loading of the first channel is estimated. In an embodiment, wireless devices are selected according to the second ranking, and the wireless devices are instructed to operate on the second access node channel one by one, according to the second ranked order, until the first channel loading no longer meets the loading threshold.

However, when all of the identified and ranked wireless devices have been instructed to operate on the second access node channel, the first channel loading may still meet the loading threshold (operation 416—NO MORE FIRST WIRELESS DEVICES). In such case, second wireless devices are identified which are in active communication with the access node on the first channel comprising an application requirement that does not meet the application requirement criteria (operation 418). An application requirement can fail to meet the application requirement when, for example, an application is associated with a minimum data rate, or a maximum permitted data delay, a maximum error rate, a guaranteed bit rate, a non-guaranteed bit rate, which is greater than a threshold.

Although the identified second wireless devices are contributing to the first channel loading, while the second wireless devices are in active communication with access node 308, the second wireless devices are not instructed to operate on the second channel. Rather, the connections of the second wireless devices are monitored until it is determined that a second wireless device is no longer in active communication with access node 308 (operation 420). For example, at least one second wireless device can enter a low power state, such as an idle state or a sleep state. In an example, access node 308 can send a query to communication node 312, and communication node 312 can respond with an indication of wireless devices which are not in active communication with access node 308, such as an idle list or other similar indication. In another example, access node 308 can determine when a second wireless device ceases to be in active communication with access node 308.

When it is determined that at least one second wireless device is not in active communication with the communication system, in operation 422, the second wireless devices are ranked in a third order. The second wireless devices can be ranked in the third order based on a modulation and coding scheme (MCS) that was assigned to each second wireless device on the first channel prior to the second wireless device entering the low power state. The second wireless devices can also be ranked in the third order according to the application requirement, data demand, and/or data usage, of each second wireless device, just prior to entering the low power state.

In an embodiment, the second wireless devices can be further ranked according to a history of uplink schedule requests from each second wireless device. A history of uplink schedule requests can comprise one or more requests from a second wireless device, while the wireless device was in active communication with access node 308, for uplink communication resources to transmit data from the second wireless device to access node 308. An uplink schedule request can comprise a buffer status report or similar request from a second wireless device. For example, the second wireless devices can be ranked according to a size of buffered information reported in its uplink schedule requests (e.g. from largest to smallest, or smallest to largest). The size of buffered information can comprise a running average amount of buffered information, or an aggregate or total amount of buffered information over a period of time when the second wireless device was in active communication with the access node. In an embodiment, the second wireless devices can be ranked in the third order based on MCS and the history of uplink schedule requests.

In an embodiment, the second wireless devices can be further ranked according to a history of traffic class indicator. A history of traffic class indicator can comprise one or more traffic classes associated with a second wireless device while the wireless device was in active communication with access node 308. In an embodiment, the second wireless devices can be ranked in the third order based on MCS and the history of the associated traffic class indicator. In an embodiment, the second wireless devices can be ranked in the third order based on MCS, the history of uplink schedule requests schedule request, and the history of the associated traffic class indicator.

In an embodiment, a traffic class identifier comprises a quality of service (QoS) class indicator (QCI). QCIs can indicate, among other things, whether a bearer channel is a guaranteed bit rate or non-guaranteed bit rate bearer. Wireless devices associated with a guaranteed bit rate can be instructed to operate on the second channel when no non-guaranteed bit rate wireless device remain. Additionally, or alternatively, wireless devices associated with a guaranteed bit rate can be prevented from being instructed to communicate on the second channel. In an embodiment, the wireless devices can be instructed to operate on the second channel according to an order determined according to the associated QCI. For example, a QCI can be assigned a numerical value, such as an integer from 1 to 9, where 9 is associated with the lowest priority and 1 is associated with the highest priority QCI. In an embodiment, the second wireless devices can be ranked in the third order based on MCS and the history of the associated QCI. In an embodiment, the second wireless devices can be ranked in the third order based on MCS, the history of uplink schedule requests schedule request, and the history of the associated QCI.

In operation 424, each second wireless device is instructed to operate on the second channel according to the third order. Since the second wireless devices are not in active communication with access node 308, cell reselection or a similar procedure can be used to instruct the second wireless devices to operate on the second channel. In an embodiment, second channel conditions reports can be received from wireless devices which are in active communication with access node 308 and which are in proximity to the second wireless devices. That is, because second channel condition reports typically cannot be requested from second wireless devices which are not in active communication with access node 308, a wireless device proximate to a second device can be identified, for example, as within a distance from a second wireless device, and a second channel condition report from the wireless device in active communication can be considered for second wireless devices proximate to the wireless device in active communication with the access node.

In operation 426, as each second wireless device is instructed according to the second order to operate on a second access node channel, the first channel loading of the first channel is estimated. When the first channel loading meets the loading threshold (operation 428—YES), another second wireless device is instructed according to the second order to operate on a second access node channel, and the first channel loading of the first channel is estimated. In an embodiment, second wireless devices are selected according to the second ranking, and the second wireless devices are instructed to operate on the second access node channel one by one, according to the third ranked order, until the first channel loading no longer meets the loading threshold. When the first channel loading does not meet the loading threshold (operation 428—NO), communication between the wireless devices and the access nodes proceeds (operation 430).

Figure 5:
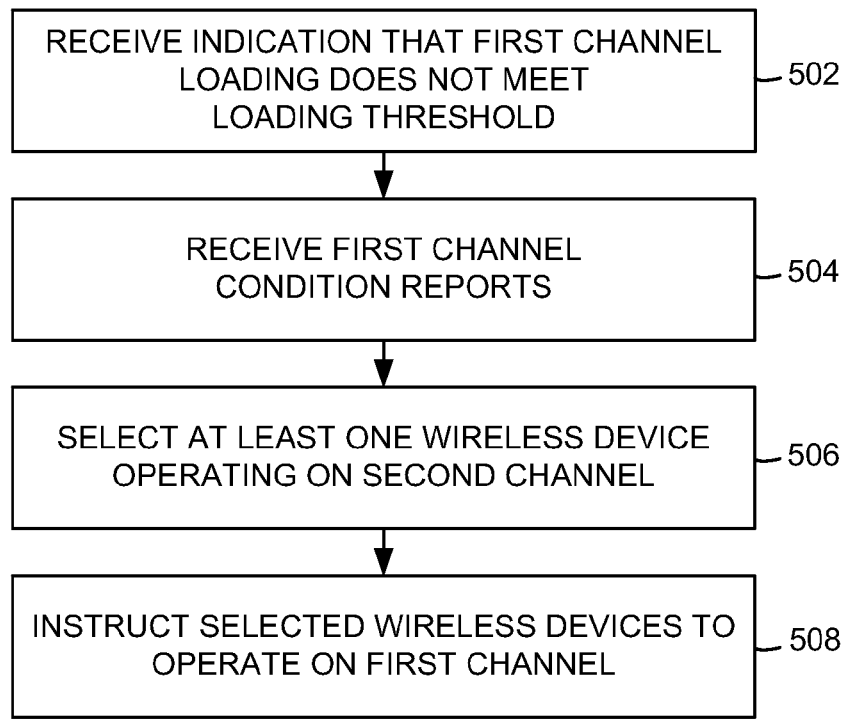
FIG. 5 illustrates another exemplary method of managing a loading of an access node channel.

FIG. 5 illustrates another exemplary method of managing a loading of an access node channel. In operation 502, an indication is received that the first channel loading of the first access node channel does not meet the loading threshold. For example, controller node 312 can receive an indication from access node 308 that the first channel loading of the first channel does not meet the loading threshold. Controller node 312 can provide the indication to access node 310. As another example, access node 308 can provide an indication to access node 310 over communication link 330 that the first access node channel does not meet the loading threshold. In an embodiment, the indication provided by access node 308 can comprise an announcement to neighboring access nodes, such as access nodes on a neighbor list, that the first channel does not meet the loading threshold.

In operation 504, first channel condition reports are received from wireless devices operating on the second channel. For example, wireless devices in active communication over the second channel (such as wireless devices 302, 304 and 306) can be instructed to scan the first channel and to provide a first channel condition report to access node 308. The first channel condition report can comprise, for example, a signal strength measurement or a signal quality measurement, and can further comprise a received signal strength indicator (RSSI), a reference signal received power (RSRP), a reference signal received quality (RSRQ), a signal to noise ratio (SNR), a signal plus interference to noise ratio (SINR), a carrier plus interference to noise ratio (CINR), and the like. In an embodiment, the first channel condition criteria can indicate that the first channel comprises a sufficient channel capacity to support a selected wireless device. For example, the first channel condition report can indicate sufficient bandwidth to support an application requirement of a wireless device. In an embodiment, the first channel condition report can further comprise an application requirement of an application running on each wireless device operating on the second access node channel.

In operation 506, at least one wireless device operating on the second access node channel is selected by an access node according to the received first channel condition reports, and in operation 508 the selected at least one wireless device is instructed to operate on the first access node channel. For example, the wireless device providing the best first channel condition report from among wireless devices 302, 304 and 306 can be selected and instructed to operate on the first channel of access node 308. Subsequent wireless devices can be selected according to the received first channel condition reports. In embodiment, the loading of the first channel can be estimated or re-determined as each selected wireless device is instructed to operate on the first channel. Selected wireless devices can be instructed to operate on the first channel until the first channel loading meets the loading threshold.

Figure 6:
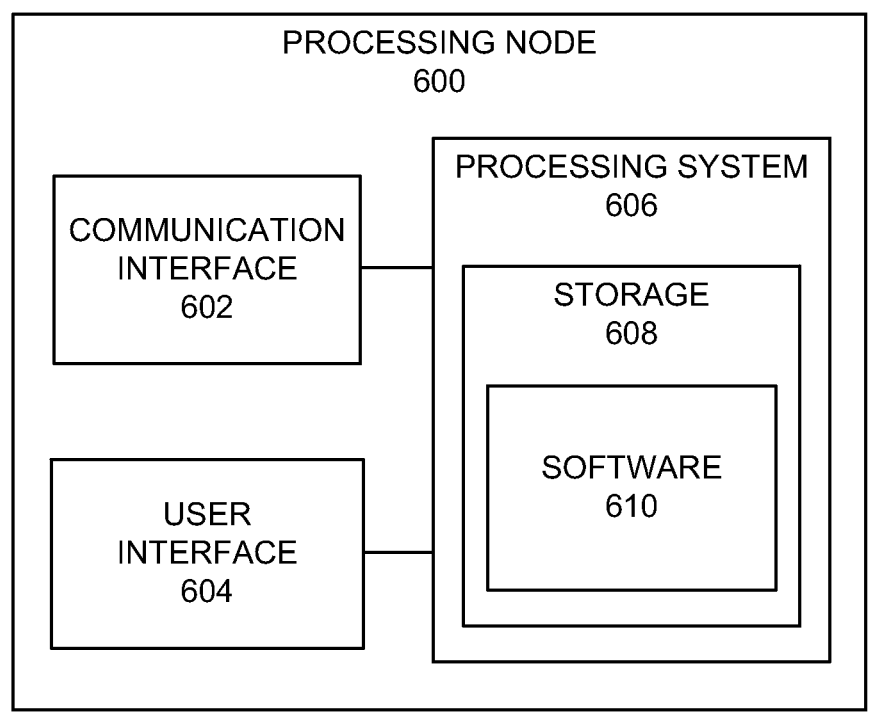
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing system 600 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 500.

Examples of processing node 600 include controller node 312 and gateway 314. Processing node 600 can also be an adjunct or component of a network element, such as an element of access node 308 or access node 310. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing a loading of an access node channel, comprising:
   determining that a first channel loading of a first access node channel meets a loading threshold;
   identifying a plurality of first wireless devices in active communication over the first access node channel, wherein each wireless device in the plurality of first wireless devices comprises an application running on the wireless device that comprises an application requirement which meets an application requirement criteria;
   ranking the plurality of first wireless devices into a first order based on a modulation and coding scheme (MCS) assigned to each wireless device in active communication over the first access node channel;
   ranking the plurality of first wireless devices into a second order within the first order based on an indication of an amount of data pending transmission from each wireless device in active communication over the first access node channel when two or more wireless devices are assigned the same MCS;
   instructing the plurality of first wireless devices ranked into the second order to operate on a second access node channel until the first channel loading does not meet the loading threshold or until no wireless devices ranked into the second order remain in the second order;
   determining that a plurality of second wireless devices cease to be in active communication with the first access node channel;
   ranking the plurality of second wireless devices into a third order based on an application requirement of each wireless device in the plurality of second wireless devices; and
   instructing the plurality of second wireless devices ranked into the third order to operate on the second access node channel until the first channel loading does not meet the loading threshold.

2. The method of claim 1, wherein instructing the plurality of first wireless devices to operate on the second access node channel further comprises:
   receiving from each of the plurality of first wireless devices a second channel condition report;
   determining a second channel loading of the second access node channel; and
   instructing a selected wireless device to operate on the second access node channel when the second channel condition report meets a channel condition criteria and when the second channel loading meets a loading criteria for the selected wireless device.

3. The method of claim 2, wherein the channel condition criteria indicates that the second access node channel comprises a sufficient channel capacity to support the selected wireless device.

4. The method of claim 2, wherein the loading criteria indicates that the second access node channel meets the application requirement of the selected wireless device.

5. The method of claim 1, wherein the application requirement comprises at least one of a minimum data rate, a maximum permitted delay, and a maximum error rate.

6. The method of claim 1, further comprising:
   identifying a plurality of second wireless devices in active communication over the first access node channel that each comprise an application requirement that does not meet the application requirement criteria; and
   instructing at least one of the plurality of second wireless devices in active communication over the first access node channel to operate on the second access node channel when the at least one second wireless device ceases to be in active communication with the first access node channel.

7. The method of claim 1, further comprising:
   receiving an indication that the first channel loading of the first access node channel does not meet the loading threshold;
   receiving from each wireless device in a plurality of wireless devices operating on the second access node channel a first channel condition report;
   selecting at least one wireless device from the plurality of wireless devices operating on the second access node channel based on the received first channel condition reports; and
   instructing the selected wireless device to operate on the first access node channel.

8. The method of claim 7, wherein the first channel condition report further comprises an application requirement of an application running on each wireless device operating on the second access node channel.

9. The method of claim 7, wherein selecting at least one wireless device from the plurality of wireless devices operating on the second access node channel further comprises:
   instructing, based on the received first channel condition reports, each wireless device operating on the second access node channel to operate on the first access node channel until the first channel loading meets the loading threshold.

10. A system for managing a loading of an access node channel, comprising:
    a processing node configured to
      determine that a first channel loading of a first access node channel meets a loading threshold;
      identify a plurality of first wireless devices in active communication over the first access node channel, wherein each wireless device in the plurality of first wireless devices comprises an application running on the wireless device that comprises an application requirement which meets an application requirement criteria;
      rank the plurality of first wireless devices into a first order based on a modulation and coding scheme (MCS) assigned to each wireless device in active communication over the first access node channel;

rank the plurality of first wireless devices into a second order within the first order based on an indication of an amount of data pending transmission from each wireless device in active communication over the first access node channel when two or more wireless devices are assigned the same MCS;

instruct the plurality of first wireless devices ranked into the second order to operate on a second access node channel until the first channel loading does not meet the loading threshold or until no wireless devices ranked into the second order remain in the second order;

determine that a plurality of second wireless devices cease to be in active communication with the first access node channel;

rank the plurality of second wireless devices into a third order based on an application requirement of each wireless device in the plurality of second wireless devices; and instruct the plurality of second wireless devices ranked into the third order to operate on the second access node channel until the first access node channel loading does not meet the loading threshold.

11. The system of claim 10, wherein the processing node is further configured to:

receive from each of the plurality of first wireless devices a second channel condition report;

determine a second channel loading of the second access node channel; and instruct a selected wireless device to operate on the second access node channel when the second channel condition report meets a channel condition criteria and when the second channel loading meets a loading criteria for the selected wireless device.

12. The system of claim 11, wherein the channel condition criteria indicates that the second access node channel comprises a sufficient channel capacity to support the selected wireless device.

13. The system of claim 11, wherein the loading criteria indicates that the second access node channel meets the application requirement of the selected wireless device.

14. The system of claim 10, wherein the application requirement comprises at least one of a minimum data rate, a maximum permitted delay, and a maximum error rate.

15. The system of claim 10, wherein the processing node is further configured to:

identify a plurality of second wireless devices in active communication over the first access node channel that each comprise an application requirement that does not meet the application requirement criteria; and instruct at least one of the plurality of second wireless devices in active communication over the first access node channel to operate on the second access node channel when the at least one second wireless device ceases to be in active communication with the first access node channel.

16. The system of claim 10, wherein the processing node is further configured to:

receive an indication that the first channel loading of the first access node channel does not meet the loading threshold;

receive from each wireless device in a plurality of wireless devices operating on the second access node channel a first channel condition report;

select at least one wireless device from the plurality of wireless devices operating on the second access node channel based on the received first channel condition reports; and instruct the selected wireless device to operate on the first access node channel.

17. The system of claim 16, wherein the first channel condition report further comprises an application requirement of an application running on each wireless device operating on the second access node channel.

18. The system of claim 16, wherein the processing node is further configured to:

instruct, based on the received first channel condition reports, each wireless device operating on the second access node channel to operate on the first access node channel until the first channel loading meets the loading threshold.

* * * * *